3,444,162
NOVEL SUBSTITUTED 1,2,4-TRIAZOLES(4H)
Asher A. Hyatt, Lexington, Mass., assignor to Monsanto Research Corporation, St. Louis, Mo., a corporation of Delaware
No Drawing. Filed Dec. 3, 1965, Ser. No. 511,520
Int. Cl. C07d 55/06; A01n 9/22
U.S. Cl. 260—240          4 Claims

ABSTRACT OF THE DISCLOSURE

Novel substituted 1,2,4-triazoles(4H) of the following formula:

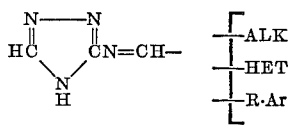

where "ALK" is heptyl, "HET" is 2-pyridyl and "R·Ar" is styryl. The compounds are useful as biological toxicants, plant growth regulators, pesticides and fungicides.

---

This invention relates to the reaction of 3-amino-1,2,4-triazole(4H) with aromatic N-heterocyclic hydrocarbon substituted aldehydes, alkyl hydrocarbon substituted aldehydes and aralkyl hydrocarbon substituted aldehydes and to the products thereof.

It is an object of this invention to provide new 3-alkylideneamino - 1,2,4-triazoles(4H), 3-aralkylideneamino-1,2,4-triazoles(4H), and 3-aromatic N-heterocyclicmethyleneamino-1,2,4-triazoles(4H).

It is another object of this invention to provide biological toxicants, such as plant growth regulators, pesticides, and fungicides.

These and other objects will become apparent as a detailed description of the invention proceeds.

According to the invention, there are prepared new and useful compounds having the formula:

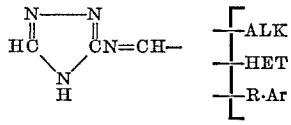

wherein ALK represents alkyl radicals free of aliphatic unsaturation having from 1 to 16 carbon atoms, HET represents aromatic n-heterocyclic hydrocarbon radicals containing one heterocyclic nitrogen atom and from 5 to 15 carbon atoms, R·Ar represents aromatic hydrocarbon substituted alkylene radicals in which R is a bivalent alkylene radical of from 2 to 4 carbon atoms and Ar is an aromatic hydrocarbon radical of from 6 to 12 carbon atoms.

There are shown below a number of the specific new compounds of the invention. It is not intended that this be a complete listing of all the compounds of the invention, but that it merely be illustrative thereof.

The following is a nonlimiting listing of a number of the new 3-alkylideneamino-1,2,4-triazoles(4H):

3-ethylideneamino-1,2,4-triazole(4H),
3-propylideneamino-1,2,4-triazole(4H),
3-butylideneamino-1,2,4-triazole(4H),
3-pentylideneamino-1,2,4-triazole(4H),
3-hexylideneamino-1,2,4-triazole(4H),
3-(2,2-dimethylbutylideneamino)-1,2,4-triazole(4H),
3-(2-ethylbutylideneamino)-1,2,4-triazole(4H),
3-(2-methylpentylideneamino)-1,2,4-triazole(4H),
3-heptylideneamino-1,2,4-triazole(4H),
3-(2,3-dimethylpentylideneamino)-1,2,4-triazole(4H),
3-(2-ethylhexylideneamino)-1,2,4-triazole(4H),
3-octylideneamino-1,2,4-triazole(4H),
3-(2,3,3-trimethylhexylideneamino)-1,2,4-triazole(4H),
3-nonylideneamino-1,2,4-triazole(4H),
3-(2,3-dimethyl-3-ethylpentylideneamino)-1,2,4-triazole (4H),
3-decylideneamino-1,2,4-triazole(4H),
3-(2,3,3,6-tetramethylheptylideneamino)-1,2,4-triazole (4H),
3-undecylideneamino-1,2,4-triazole(4H),
3-dodecylideneamino-1,2,4-triazole(4H),
and so forth.

It is also intended to cover 3-aralkylideneamino-1,2,4-triazoles(4H) and the following are a non-limiting list thereof:

3-cinnamylideneamino-1,2,4-triazole(4H),
3-(p-methylcinnamylideneamino)-1,2,4-triazole(4H),
3-(p-ethylcinnamylideneamino)-1,2,4-triazole(4H),
3-(m-propylcinnamylideneamino)-1,2,4-triazole(4H),
3-(4-phenyl-2-butenylideneamino)-1,2,4-triazole(4H),
3-(4-tolyl-2-butenylideneamino)-1,2,4-triazole(4H),
3-(4-xylyl-2-butenylideneamino)-1,2,4-triazole(4H),
3-(2,3,5-trimethylcinnamylideneamino)-1,2,4-triazole- (4H),
3-[4-(3,4-diethylphenyl)-2-butenylideneamino]-1,2,4-triazole(4H),
3-[3-(3-methyl-4-propylphenyl)-2-pentenylideneamino]-1,2,4-triazole(4H),
3-4-(o-butylphenyl)-2-butenylideneamino-1,2,4-triazole- (4H),
3-(4,5-dimethyl-3-ethylcinnamylideneamino)-1,2,4-triazole(4H),
3-[5-(3,4-diethylphenyl)-2-pentenylideneamino]-1,2,4-triazole(4H),
3-[5-(3-ethyl-4-propylphenyl)-2-pentenylideneamino]-1,2,4-triazole(4H),
3-[4-(3,5-diethylphenyl)-2-butenylideneamino]-1,2,4-triazole(4H),
3-[5-(2,5-dipropylphenyl)-2-pentenylideneamino]-1,2,4-triazole(4H),
3-(5-biphenylyl-2-pentenylideneamino)-1,2,4-triazole- (4H),
and so forth.

Some of the novel compounds of the invention of the 3-aromatic N-heterocyclicmethyleneamino-1,2,4-triazole- (4H) type are shown in the following nonlimiting list:

3-(2-pyridylmethyleneamino)-1,2,4-triazole(4H),
3-(3-pyridylmethyleneamino)-1,2,4-triazole(4H),
3-(4-pyridylmethyleneamino)-1,2,4-triazole(4H),
3-(2,6-dimethyl-4-pyridylmethyleneamino)-1,2,4-triazole(4H),
3-(4,6-dimethyl-2-pyridylmethyleneamino)-1,2,4-triazole(4H),
3-(5-ethyl-2-pyridylmethyleneamino)-1,2,4-triazole- (4H),
3-(4-methyl-3-pyridylmethyleneamino)-1,2,4-triazole- (4H),
3-(3-methyl-2-pyridylmethyleneamino)-1,2,4-triazole- (4H),
3-(3-ethyl-4-pyridylmethyleneamino)-1,2,4-triazole- (4H),
3-(3-ethyl-2-pyridylmethyleneamino)-1,2,4-triazole- (4H),
3-(5-ethyl-2-methyl-4-pyridylmethyleneamino)-1,2,4-triazole(4H),
3-(5-ethyl-4-methyl-2-pyridylmethyleneamino)-1,2,4-triazole(4H),
3-(5-propyl-2-pyridylmethyleneamino)-1,2,4-triazole- (4H),
3-(5-butyl-2-pyridylmethyleneamino)-1,2,4-triazole- (4H),
3-(4-pentyl-2-pyridylmethylene)-1,2,4-triazole(4H), 3-(4,5,6-tripropyl-2-pyridylmethyleneamino)-1,2,4-triazole(4H),
3-(4-butyl-6-pentyl-3-pyridylmethyleneamino)-1,2,4-triazole(4H), and so forth.

Preparation of the presently provided novel compounds is effected by contacting 3-amino-1,2,4-triazole(4H) with aromatic N-heterocyclic hydrocarbon substituted aldehydes, alkyl substituted aldehydes and aralkyl substituted aldehydes, as illustrated by the equation:

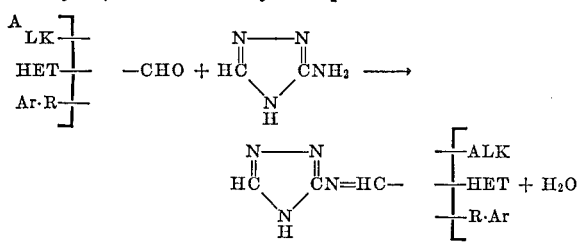

wherein ALK, HET, and R·Ar are as defined above.

In preparing the compounds of this invention, useful hydrocarbon substituted aldehydes of the alkyl type are: acetaldehyde, propionaldehyde, butyraldehyde, valeraldehyde, isovaleraldehyde, 2,2-dimethylbutyraldehyde, 2-ethylbutyraldehyde, hexanal, 2-methylvaleraldehyde, heptanal, 2,3-dimethylvaleraldehyde, 2-ethylhexanal, octanol, 2,3,3-trimethylhexanal, nonal, 3-ethyl-2,3-dimethylvaleraldehyde, decanal, 2,3,3,6-tetramethylheptanal, undecanal, dodecanal, and so forth.

Useful hydrocarbon substituted aldehydes of the aralkyl type are, for example: cinnamaldehyde, p-methylcinnamaldehyde, p-ethylcinnamaldehyde, m-propylcinnamaldehyde, 4-phenylcrotonaldehyde, 4-tolylcrotonaldehyde, 4-xylylcrotonaldehyde, 2,3,5-trimethylcinnamaldehyde, 4-(3,4-diethylphenyl)crotonaldehyde, 5-(2,3,4,5-tetramethylphenyl)-2-pentenal, 3-(3-methyl-4-propylphenyl)-2-pentenanl, 4-(o-butylphenyl)crotonaldehyde, 3-ethyl-4,5-dimethylcinnamaldehyde, 5-(3,4-diethylphenyl)-2-pentenal, 4-(3,5-diethylphenyl)crotonaldehyde, 5-(2,5-dipropylphenyl)-2-pentenal, 3-naphthyl-2-propenal, 5-biphenylyl-2-pentenal, and so forth.

Useful aldehydes of the aromatic N-heterocyclic type, include: picolinaldehyde, nicotinaldehyde, isonicotinaldehyde, 2,6-dimethylisonicotinaldehyde, 4,6-dimethylpicolinaldehyde, 5-ethylpicolinaldehyde, 4-methylnicotinaldehyde, 3-methylpicolinaldehyde, 3-ethylisonicotinaldehyde, 3-ethylpicolinaldehyde, 5-ethyl-2-methylisonicotinaldehyde, 5-ethyl-4-methylpicolinaldehyde, 5-propylpicolinaldehyde, 5-butylpicolinaldehyde, 4-pentylpicolinaldehyde, 4,5,6-tripropylpicolinaldehyde, 4-butyl-6-pentylnicotinaldehyde, and so forth.

In carrying out the process of this invention, the 3-amino-1,2,4-triazole(4H) is simply contacted with the aldehyde until reaction is complete. Generally, the reaction proceeds at room temperature, and the reaction mixture may even be advantageously cooled, at least initially. Useful temperatures for conducting the preparation are, for example, the reflux temperature of the reaction mixture, or any desired temperature from below 0° C. up to below the decomposition point of the ingredients of the reaction mixture.

It is also an advantage in moderating the reaction to add one of the reactants slowly and gradually to the other, though the reactants may optionally be added all at once, preferably together with a solvent or diluent. Solvents or diluents which may be used to moderate the reaction and to facilitate stirring, and so forth, are for example, alcohols, such as methanol, ethyl alcohol, propyl alcohol, and the like.

The ratio of reactants may vary, molar ratios of triazole to aldehyde of at least 1:10 to about 10:1 may be used, but since the reaction takes place by the condensation of one mole of triazole with one mole of aldehyde, advantageously a 1:1 ratio of reactants is employed. Excess reactant may be removed at the end of the reaction by, for example, extraction or distillation.

Atmospheric pressure is satisfactory for conducting the reaction, though sub- or super-atmospheric pressures may be used if desired, ranging from 0.05 millimeter of mercury (mm. Hg) to about 5000 pounds per square inch (lb./in.$^2$).

No catalyst is required. Reaction time may vary. In general, it will depend on the nature of the reactants used and on the temperature of the reaction mixture. Ordinarily reaction times will vary from less than one minute to several hours.

The isolation of the products may be accomplished by general standard procedures, such as distillation, extraction, or crystallization, for example.

The present new compounds are generally stable, well defined products, soluble in ketones, such as acetone and ethylmethyl ketone, for example.

The presence of the aromatic and N-heterocyclic substituents imparts a biological toxicant property hitherto unknown to this class of compounds, as demonstrated by testing the known 3-furfurylideneamino-1,2,4-triazole(4H) under the same conditions as the compounds described in this invention. The new compounds are useful for a variety of industrial and agricultural uses; for example, the 3-cinnamylideneamino-1,2,4-triazole(4H) may be used as a biological toxicant and is particularly effective as a fungicide.

The invention will be further described with reference to the following specific examples. These examples are given for purposes of illustration only and are not to be taken as in any way restricting the invention.

EXAMPLE 1

This example illustrates the preparation of a compound in accordance with this invention.

To a reaction flask containing a mixture consisting of 27 grams (g.) (about 0.3 mole) of 3-amino-1,2,4-triazole(4H) dispersed in 150 milliliters (ml.) of methanol at a temperature of 40° C., is added 42 g. (about 0.3 mole) of cinnamaldehyde. The temperature of the mixture is maintained at from 40° to 50° C. during addition. The reaction mixture is then refluxed for one hour, cooled to 5° C. and filtered. The crude product is then washed several times with methanol and dried.

The resultant product is 3-cinnamylideneamino-1,2,4-triazole(4H), a pale green solid weighing 14.9 g. (about 25% theoretical yield), and melting at 157°–161° C.

Elemental analysis of the product confirms the assigned empirical formula $C_{11}H_{10}N_4$.

Element (CHN): Calculated: C, 66.6; H, 5.1; N, 28.2%. Found: C, 66.7; H, 5.5; N, 27.9%.

EXAMPLE 2

This example further illustrates the preparation of a compound in accordance with this invention.

To a reaction flask containing a mixture consisting of 30 g. (about 0.35 mole) of 3-amino-1,2,4-triazole(4H) dispersed in 150 ml. of methanol at 40° C., is added 40 g. (about 0.35 mole) of heptanal. The temperature of the mixture is maintained at from 40° to 50° C. during addition. The reaction mixture is then refluxed for one hour, hour, cooled to 5° C., and filtered. The crude product is then washed several times with methanol and dried.

The resulting product is 3-heptylideneamino-1,2,4-triazole(4H), a white solid weighing 45 g. (about 70% theoretical yield), melting at 196°–200° C.

Elemental analysis of this product confirms the assigned empirical formula $C_9H_{16}N_4$.

Element (CHN): Calculated: C, 60.1; H, 8.9; N, 31.1%. Found: C, 60.1; H, 9.0; N, 30.8%.

EXAMPLE 3

This example further illustrates the preparation of a compound in accordance with this invention.

To a reaction flask containing a mixture consisting of 30 g. (about 0.35 mole) of 3-amino-1,2,4-triazole(4H) dispersed in 150 ml. of methanol at 40° C., is added 39 g. (about 0.35 mole) of picolinaldehyde. The temperature of the mixture is maintained at from 40° to 50° C. during addition. The reaction mixture is then refluxed for one hour, cooled to 5° C., and filtered. The crude product is washed several times with methanol and dried.

The resulting product is 3-(2-pyridylmethyleneamino)-1,2,4-triazole(4H), a white solid weighing 28.6 g. (about 46% theoretical yield) and melting at 249°–253° C.

Elemental analysis of this product confirms the assigned empirical formula $C_8H_7N_5$.

Element (CHN): Calculated: C, 55.4; H, 4.1; N, 40.5%. Found: C, 53.7; H, 4.5; N, 41.3%.

EXAMPLE 6

This example further illustrates the use of compounds of this invention as herbicides.

In herbicidal activity tests, 0.5% aqueous emulsions of both 3-cinnamylideneamino-1,2,4-triazole(4H) and 3-(2-pyridylmethyleneamino)-1,2,4-triazole(4H) are applied as sprays to two-week old plants, at a rate equal to about 9 lb./a. After 14 days in a greenhouse, the plants are observed for phytotoxic action of the chemical. The results are summarized in the following table wherein 0=no phytotoxicity, for example, growth equivalent to that usually obtained from the species of plant without application of a test chemical. The rating 4 corresponds to complete suppression of growth.

POSTEMERGENCE TESTING

| Compound | Rate, percent | Wild oat | Bromegrass | Ryegrass | Foxtail | Barnyard | Crabgrass | Pigweed | Wild buckwheat |
| --- | --- | --- | --- | --- | --- | --- | --- | --- | --- |
| 3-cinnamyl Ideneamino 1,2,4-triazole(4H) | 0.5 | 3 | 3 | 3 | 4 | ---- | 3 | 4 | 4 |
|  | 0.2 | 3 | 3 | 2 | 3 | 3 | 3 | 3 | 2 |
|  | 0.05 | 2 | 1 | 2 | 2 | 2 | 3 | 2 | 2 |
| 3-(2-pyridyl) Methyleneamino 1,2,4-triazole(4H) | 0.5 | 3 | 4 | 4 | 3 | ---- | 3 | 3 | 3 |
|  | 0.2 | 3 | 3 | 1 | 3 | 3 | 3 | 3 | 2 |
|  | 0.05 | 2 | 3 | 1 | 3 | 2 | 3 | 2 | 0 |

EXAMPLE 4

This example illustrates the use of a compound of this invention as a fungicide.

To screen for fungicidal activity against *Pythium ultimum*, a soil fungus causative of seed decay, cornmeal-sand cultures of this organism are blended into autoclave-sterilized soil to achieve essentially a mono-organism soil-type. Paper cups containing 30 g. samples of the mono-organism soil-type are each individually drenched with 4 ml. of a liquid containing 231 parts per million (p.p.m.) of 3-cinnamylideneamino-1,2,4-triazole(4H), the product of Example 1. The final concentration based on soil weight is 30 p.p.m. The paper cups containing the drenched soil samples together with paper cups containing undrenched soil samples are placed into an incubation chamber at 90%–100% relative humidity for 48 hours. At the end of this time the cups are removed from the incubation chamber and the samples observed for fungus growth.

Complete suppression of fungus growth is observed for the samples treated with the product of Example 1.

By contrast 3-furfurylideneamino-1,2,4-triazole(4H), a known biological toxicant, when tested as above exhibited fungus growth equal to that of the undrenched samples.

EXAMPLE 5

This example illustrates the use of compounds of this invention for the control of plant species.

Aluminum pan flats are filled with mixtures of two-thirds one-quarter mesh sieved soil, and one-third sand. Over one-third of the soil surface of each pan are scattered 20 seeds each of different kinds of grasses; seeds of broadleaf plants are randomly scattered over the remaining surface. The seeds are then covered with an aqueous solution of fertilizer and an insecticide. The surfaces of the boxes are next sprayed with 30 ml. of an acetone solution of the test chemicals, containing the chemicals at a rate equal to 25 pounds per acre (lb./a.). Then the pans are placed in water and allowed to absorb moisture until the soil surface is completely moist, after which they are held in a greenhouse under standard conditions of moisture and sunlight. After ten days, the number and species of plants which have germinated and grown are observed. 3-cinnamylideneamino - 1,2,4 - triazole(4H), 3 - heptylideneamino-1,2,4-triazole(4H), and 3-(2-pyridylmethyleneamino)-1,2,4-triazole(4H) caused substantially complete suppression of plant growth and germination on foxtail when applied in the above manner.

EXAMPLE 7

This example illustrates the use of compounds of this invention as pesticides for the destruction of lower animal life forms.

Contact activity against houseflies

In insecticidal screening, activity for control of the common housefly (*Musca domestica*) is demonstrated as follows. One microliter of an acetone solution containing 3-(2-pyridylmethyleneamino)-1,2,4-triazole(4H) at a concentration of 10 milligrams per milliliter (mg./ml.) is applied to the dorsum of the thorax of each test fly, the test being carried out on 48-hour old female houseflies. The specimen flies are then held at 68° F. and in the range of from 50% to 60% relative humidity for 24 hours, prior to observation for mortality. A 30% kill is produced by the pyridyl compound when tested in the above manner.

Contact activity against the plum curculio

In insecticidal screening, activity for control of the plum curculio (*Conotrachelus nenuphar*) is demonstrated as follows. One microliter of an acetone solution containing 3-heptylideneamino-1,2,4-triazole(4H) at a concentration of 20 mg./ml. is applied to the under side of the abdomen of each test plum curculio. Plastic tubes (2 x ¾ inch), containing a small slice of apple and three adult plum curculio, are stoppered at each end with sifter cap (¾ inch) and held at room temperature for 48 hours prior to observation for mortality. A 30% kill is produced by the heptylidene compound when tested in the above manner.

Feeding activity against southern armyworm larvae

In insecticidal screening, activity for control of armyworms (*Prodenia eridania*) is demonstrated as follows. Lima bean leaf discs (7 mm. in diameter) are prepared by evaporating one microliter of an acetone solution containing 3-cinnamylideneamino-1,2,4-triazole(4H) at a concentration of 10 mg./ml., on the surface of each disc. A second instar armyworm larva is engaged with each leaf disc by using a ⅞ inch plastic cap (the leaf disc is small enough to permit complete consumption by the larva). The plastic caps containing the leaf discs and larvae are each individually put into clear plastic containers and held for 48 hours at room temperature. At the end of this period, a 60% kill is produced by the cinnamylidene compound when tested in the above manner.

EXAMPLE 8

This example illustrates the use of a compound of this invention as a defoliant.

A defoliant composition containing 3-(2-pyridylmethyleneamino)-1,2,4-triazole(4H) is prepared by adding to 1.5 ml. of a 2% active solution of the compound of the invention, 0.2 ml. of a solution consisting of 3 parts of cyclohexanone and 1 part of "Emulsifier-L," a polyalkylene glycol ether-long-chain alkylbenzene sulfonate, and 4.5 ml. of water.

Potted young privet shrubs are sprayed with aqueous emulsions containing the new compound at rates of 1 lb./a. and 5 lb./a., using a dilution of 10 gallons per acre (gal./a.), after which the shrubs are maintained under controlled conditions in a greenhouse for ten days. At the end of this period the shrubs sprayed at the rate of 5 lb./a. are 76–99% defoliated, while shrubs sprayed at the lower rate of 1 lb./a. are 26–50% defoliated.

The new compounds of this invention are generally applied for herbicidal and pesticidal use in the form of sprays or aerosols. Useful sprays may be prepared by dispersing the present products in water with the aid of a wetting agent, to prepare aqueous dispersions. For example, a polyalkylene glycol ether-long-chain alkylbenzene sulfonate wetting agent may be used to prepare such dispersions or emulsions. The products may also be applied as oil-in-water emulsion sprays. The present products may also be dissolved or dispersed in liquified gases such as fluorochloroethanes or methyl chloride and applied to plants or pest organisms from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The amount of the active toxicant compound in the composition as applied will vary with the active ingredients, the manner of application, the species to be destroyed and the resistance of the plants to be sprayed, for example, and the formulation and the ratio of applications are suitably adjusted in accordance with these factors.

It is apparent that this invention may be extended to uses beyond those specifically described and that many widely differing embodiments can be made without departing from the spirit and scope thereof as defined herein. Therefore, it is not intended to be limited except as indicated in the appended claims.

What is claimed is:
1. A compound having the formula

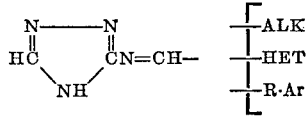

where ALK is heptyl, HET is 2-pyridyl and R·Ar is styryl.
2. 3-cinnamylideneamino-1,2,4-triazole(4H).
3. 3-heptylideneamino-1,2,4-triazole(4H).
4. 3-(2-pyridylmethyleneamino)-1,2,4-triazole(4H).

References Cited

UNITED STATES PATENTS

| | | | |
|---|---|---|---|
| 2,970,148 | 1/1961 | Fox | 260—240 XR |
| 2,977,359 | 3/1961 | Rutschmann | 260—240 |

FOREIGN PATENTS

| | | |
|---|---|---|
| 972,405 | 7/1959 | Germany. |

OTHER REFERENCES

Pesson et al.: Comptes Rendus, vol. 247, pages 787 to 789 (1958).

JOHN D. RANDOLPH, Primary Examiner.

U.S. Cl. X.R.

71—92; 260—240.7, 308; 424—263, 269